United States Patent [19]
Schutz

[11] Patent Number: 5,514,029
[45] Date of Patent: May 7, 1996

[54] PROCESS FOR THE CONTINUOUS MOLDING PACKAGING OF A PRODUCT IN PASTE SEMILIQUID OR LIQUID FORM

[75] Inventor: Jorge A. Schutz, Province of Buenos Aires, Argentina

[73] Assignee: Norberto Castanon & CIA. S.A.C. y F., Buenos Aires, Argentina

[21] Appl. No.: 51,090

[22] Filed: Apr. 21, 1993

[30] Foreign Application Priority Data

Apr. 21, 1992 [AR] Argentina .................................. 322176

[51] Int. Cl.⁶ .................................................. A22C 11/00
[52] U.S. Cl. .................................................. 452/35; 452/30
[58] Field of Search .................................. 452/35, 30, 46; 53/433

[56] References Cited

U.S. PATENT DOCUMENTS

| | | | |
|---|---|---|---|
| 3,647,485 | 3/1972 | Seiferth et al. | 99/174 |
| 3,815,322 | 6/1974 | Wyslotsky | 425/388 |
| 4,229,927 | 10/1980 | Day | 53/433 |
| 4,439,975 | 4/1984 | Laing | 53/590 |

*Primary Examiner*—Willis Little
*Attorney, Agent, or Firm*—Brumbaugh, Graves, Donohue & Raymond

[57] ABSTRACT

For molding and packaging a product having paste, semi-liquid or liquid form, e.g., frankfurter-type sausage paste, two films such as thermoplastic films are fed longitudinally, respectively above and below tubes feeding the product. For each of the feeding tubes, a longitudinal tubular cavity is formed between the films, e.g., by localized longitudinal welding, and the tubular cavities are filled with the product being fed. In feeding the films and the product, transverse seals are formed at intervals to terminate the filled cavities, e.g., by localized transverse welding of the films.

17 Claims, 5 Drawing Sheets

PROCESS FOR THE CONTINUOUS MOLDING PACKAGING OF A PRODUCT IN PASTE SEMILIQUID OR LIQUID FORM

I. BACKGROUND OF THE INVENTION

This invention refers to a process for packaging a product in paste or semiliquid form and the machine for carrying out said process and the product thus obtained.

In a preferred form of embodiment the process and the machine of this invention are used for packaging sausage, commonly known as the frankfurter type sausage.

It is presently widely known that sausages, particularly the frankfurter type sausage, are stuffed in a tripe or tube of synthetic material (plastic), and which must be then peeled off at the time the sausage is to be prepared for ingestion.

Known processes in use are comparatively expensive and slow, as they require steps which could be set aside and which, in turn, require the use of expensive machinery.

In fact, and so as to summarize the present operative procedure, the food stuffed in synthetic tripe of great length which, is in turn twisted at pre-determined sites so as to form a row of independent sausage, of a particular length, which hang in carriers for cooking. After this latter operation, the sausage must be cooled so as to submit it to the peeling action of the peeling machines. That means that the plastic lining or sleeve (tripe is removed so as to have sais sausage packaged in vacuum).

Known processes for the elaboration of skinless sausage require the use of four machines, namely: (a) the stuffing machine, (b) the cooling and twisting machine, (c) the peeling off machine, and (d) the packaging machine. Between the twisting and peeling stages, the sausage is cooked, such as the frankfurter type sausage, salami, etc. Once cooked the product is passed through the cooling and peeling machines, and then carried to the packing machine so that, once this stage is completed, sausage can then be delivered. On account of the characteristics of the known process of elaboration, there occurs an approximately 8% reduction in raw material.

The above-described conventional line of elaboration requires a minimum place of 12 meters long for the five mentioned processes.

As it is not possible to achieve an absolute vacuum, in the conventional package there appears a small amount of air in contact with the product, which makes the product perishable in a more or less short time on account of contamination.

Technology further developed new packaging processes but the same were created for the packaging of products in granule, powder or liquid form, in which the amount of product to be packaged is regulated by a delivering device and no pressure is required on the product in order to shape the package.

On the other hand, said processes lack a continous sequence, but are of an intermitent sequence, whereby their yielding is seriously limited as compared with a process of continuous sequence.

In the particular case of the packaging of frankfurter type sausage, the problem arising from the attempt to obtain a continuous method is worsened by the cooking process, as well as by the fact that the sausage paste adopts the shape of the package, which requires certain pressure at the packaging stage. Said pressure causes the transversal section of the package to be constant and the product weight is thereby also constant and is directly proportional to the length of the package.

Also related to the continuous process is the need for the package shaping the sausage to be the final package to be delivered to consumers, so as to avoid contamination produced when the product must be enclosed within the final packaged once shaped and cooked.

U.S. Pat. No. 5,053,239 refers to a process and apparatus for producing frankfurter type sausage and claims that the sssausage is produced directly within the final package, which then allows the cooking of the sausage paste thus packaged.

However, though said process seems to achieve a certain improvement over the already known processes, it is of intermitent sequence and requires a synchronism between feeding of the portions forming the sausage and the means for transversally closing the package. As said patent contains no illustration of the particular machine for producing the pieces of sausage paste of a pre-determined size, nor does it show the manner in which said operation is controlled in order to attain a synchronism of the means for transversally closing the package, it can be considered that said process is not likely to be carried out in practice.

In fact, it is to be noted that feeding tubes 1 extend between peripheral grooves of cylinders 14 and 15 until reaching the discharge outlet near the shaping means formed by rods 4 and 5, which further contain elements transversally pressing the portions of the tubular package containing no sausage paste. The specification of said U.S. Pat. No. 5,053,239 also fails to explain the advance movement through the feeding tube of small portions of sausage paste and the kind of means used for making each sausage portion maintain a constant space regarding the subsequent portion. Furtermore, for the transversal sealing of the film, the process requires that said area be free from sausage paste, which makes it noticeably different from the method of this invention.

The system provided in Argentine Patent 228,903 is already known, said patent case referring to a discontinuous feeding system.

Such system operation consists in feeding molding cavities between longitudinal pre-welded films, but said cavities are interconnected by minor channels, thus producing a zig-zag path between films, and the zones where said channels are arranged are then sealed up.

In fact, it is hard to believe that this process actually works, as the paste pressures and the section differences in path and in the zig-zag arrangement produces at least a stopping effect on the sliding movement, which at least reduces yielding to non-economical limits.

The process and machines of this invention allow the continous production of products in paste or semiliquid form, by using a single package shaped by pressure exerted by the product and wherein the stuffed packaged comprises a transversal section and a length measure of the package.

In the particular case of the packaging of frankfurter type sausage, sais sausage is packaged without need of a synthetic tripe forming the sausage.

The sausage is then packaged within the final package to be delivered to consumers and is then cooked, which secures the non-contamination of the product during the production process. The pressure whereby the sausage paste is packaged removes all possibilities of having any air remainder within the package which could then affect the product.

In addition, the process and machine of this invention brings about important economic advantages, such as: an important cost reduction over the raw material required for the sausage elaboration on account of the elimination of the synthetic tripe, which cannot be substituted in the conventional process; a significant reduction of processes and steps, since the sausage produced with this machine, such as hereinafter explained, is cooked and then directly delivered; less 8% reductions produced in the conventional process, which are practically eliminated; an important increase in production yielding, as the machine of this invention, when operating at its maximum speed, exceeds four times the production capacity of the conventional machinery, and it can increase its yielding up to eight times more when operating at higher speed, without any difficulty. In addition there is a significant reduction of the surface required for production premises, since it is one single machine, it is of reduced sizes, namely, 2 meters, as compared with the known ones which presently require 12 meters, and since it has a production rate very much higher than those presently known in the art.

II. MAIN OBJECT

The process of this invention essentially consists in a continuous process for packaging a product in paste or liquid form, which comprises the following steps:

continuously feeding a pair of films, one above and the other below the feeding tubes of the product to be packaged;

continuously shaping in said films tubular longitudinal cavities around each of said feeding tubes;

wholly filling, with the necessary pressure and in continuous form, said tubular cavities with the product to be packaged;

without interrupting the advance movement of the tubular cavities filled with the product, pressing on transversal stripes over said cavities until said films come into contact, and welding said films one to the other, thus forming the vacuum tight package of the packaged product.

Likewise, the machine required for carrying out the process of this invention constitutes a further inventive object, which consists in a machine which comprises a continuous advance feeder of two thermoplastic film set having guides leading to a zone where both overlapping films concur and a transversal folding means for one of said films, thus defining continuous longitudinal cavities alternated by longitudinal stripes overlapping the other film; a longitudinal unit for welding the overlapping longitudinal stripes, at the end of which outlets of a package product feeder are arranged, which loads said product throughout the length of the cavities formed by the folding means; and a unit for welding the transversally overlapping stripes which, with pressing means, works at predetermined distances up to the contact limit of both films in said stripes of the set of films; wherein each welding unit comprises heating means followed by cooling means correlatively arranged in said order according to the advance direction of the set of films.

A further object of this invention is a molding package containing the load resulting from the process and formed by the machine as above described, which comprises two plastic films, which form casings which receive the product molded "in situ"; said casings, which are formed by cavities resulting from only one of said films and which are closed by the other film like a fixed tap, constitute fixed compartments defined by the seams of continuous welding, which cover stripes of longitudinal joint, which cross stripes of transversal joint around said casings.

The object of this invention consists in a series of characteristics which, once combined, allow to obtain a high scale production of frankfurter type sausage or other products, which are molded "in situ" in their own package which is formed during the same process.

Said process is, on the one hand, continuous as it permanently feeds at a constant speed both the package forming film and the paste intended for producing the product to be packaged.

Said process is also continuous since, during said advancing movement, a longitudinal sealing occurs among the continuous product compartments, as well as the subsequent transversal section sealing, which also occurs with the sliding movement of the product in said area, without interrupting said advancing movement.

Said transversal seal allows the necessary pressure on the said paste used in the production of a package with a predetermined shape.

This process is further safe as to the sealing pattern, and since it is produced by sets of heating means (which soften the molecules of the material by fixing films one to the other), correlatively followed by sets of cooling means which fix the welding seams, thus avoiding a taking off procedure as a result of the inner pressure.

According to this invention, the past feeding tubes, together with a set of rods, produce the necessary film folding for defining the cells receiving said product.

A further object of this invention is that of including means for controlling the aligned feeding of films intended to form the package, including means for correcting and balancing any deviation of said films so as to secure an exact overlapping.

In the light of the above, one can now imagine that said system will be widely accepted once put into practice, regardless of the category or use assigned thereto, since on account of the characteristics that define the same, it can be equally used for the packaging and molding "in situ" of all kind of foodstuff products, sweets, medicinal products, chemical products and the like, either in the form of a paste, gelatin, emulsion, and liquid, etc.

II. MAIN OBJECT

For the above specified purposes and such as it is claimed, the said process for the molding packaging of foodstuff substances and other applications, which could be intended for the packaging of products such as frankfurter type sausage paste (30), either skinless or others, said process further comprising two overlapping thermoplastic films (1) and (2), for shaping fixed casings for packaging and molding the product (30), said process being characterized in that it produces the feeding of films (1-2) and the product (30) to be packaged therebetween by the joint sliding (1-2-30) and advance movement; longitudinally folds (1') one of the films (1), thus forming in each folding longitudinal continous cavities (3) defined by longitudinal stripes (1"); join by continuous welding (31) said longitudinal stripes (1") of the first film (1) with zones overlapping the second film (2), by two correlative heating (e) and cooling (f) stages, respectively, while the continuous advance movement of the arrangement (h) remains, so as to form tubular cavities; simultaneously introduce throughout the resulting tubular cavities (3), the product (30) to be packaged; divide the set of films (h) and the product (30) by jointly pressing on the virtual transversal stripes which, at predetermined distances, cross said tubular cavities (3) with product (30), thus forcing product (30) to move and causing the pressure resulting from contents of said zone; and, once films come into contact in each transversal stripe (32), said films are welded the same as for the film union (1-2) in longitudinal stripes (31).

In addition, as a result of the pressure produced in the transversal stripes and the subsequent welding operation, the desired shaping is obtained at the ends of the fixed casing.

III. DRAWINGS

For the sake of clarity and the better comprehension of the object of this invention, the same is illustrated by means of several figures, which have represented one preferred embodiment of this invention, all of which is included as an example, though not limited thereto, wherein.

Figure 3:
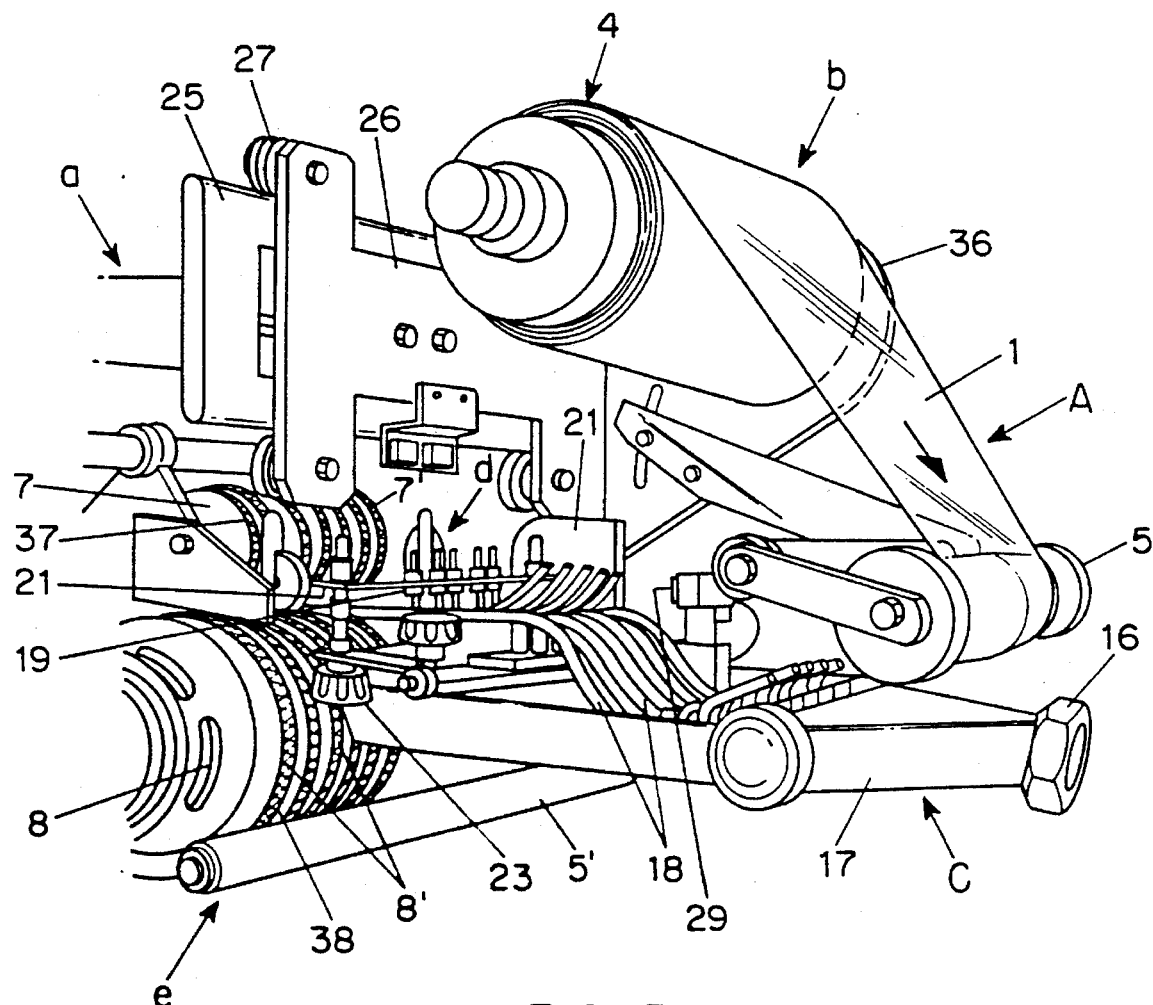

FIG. 3 is a detail perspective side front view of the same machine, corresponding to the feeding inlet thereof, but which does not show the entrance of the lower film so as to allow the display of elements disposed in each entry, such as the fold shaping elements and the heating rolls of the first welding unit. The automatic balancing carriage for deviations in film feeding appears in a back position in response to the command given by each photoelectric sensor.

Figure 4:
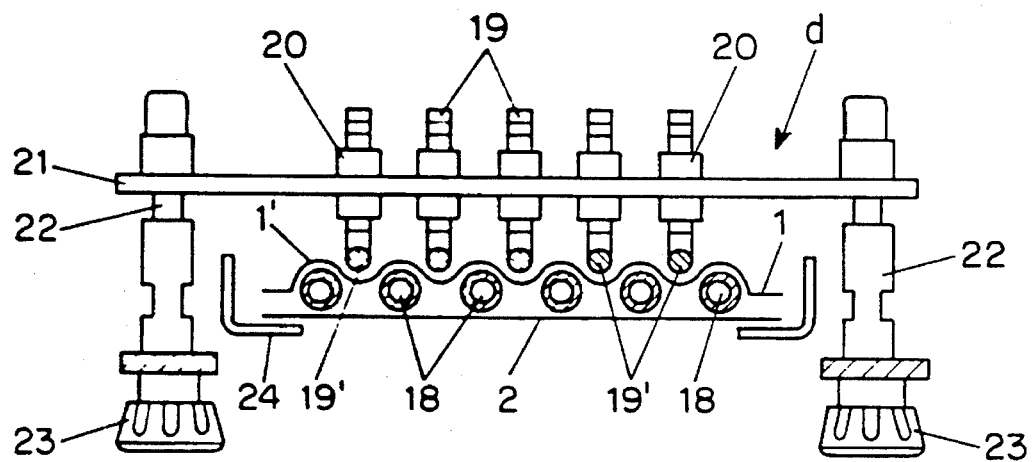

FIG. 4 is a cross-section detail of the rigid pipes for feeding the product to be packaged, within the folding pre-shaping means, and which shows the presence of longitudinal members, the support member and the height regulating means. This figure provides a clear idea in which the said rigid pipes work in turn as folding taps.

Figure 5:
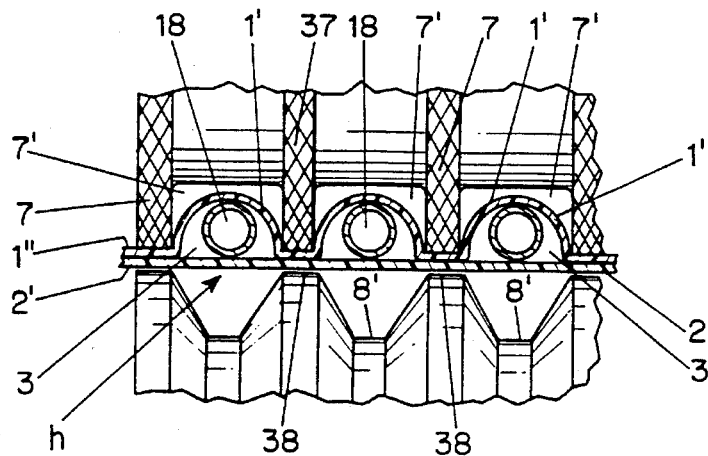

FIG. 5 is a partial section detail of the heating rolls, which shows the grooves wherein folds are adjusted as formed in one of said plastic films. This Figure shows the manner in which the periphery of said rolls coincides with the longitudinal stripes in contact which are welded and subsequently fixed by means of cooling rolls.

Figure 6:
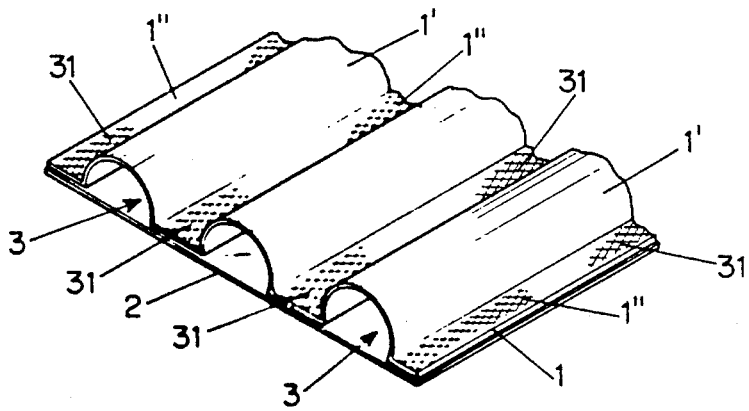

FIG. 6 is a perspective detail view of the set of plastic films, once one of them has been folded and longitudinal stripes thereof have been affixed thereto, so as to form longitudinal tubular cavities.

Figure 1:
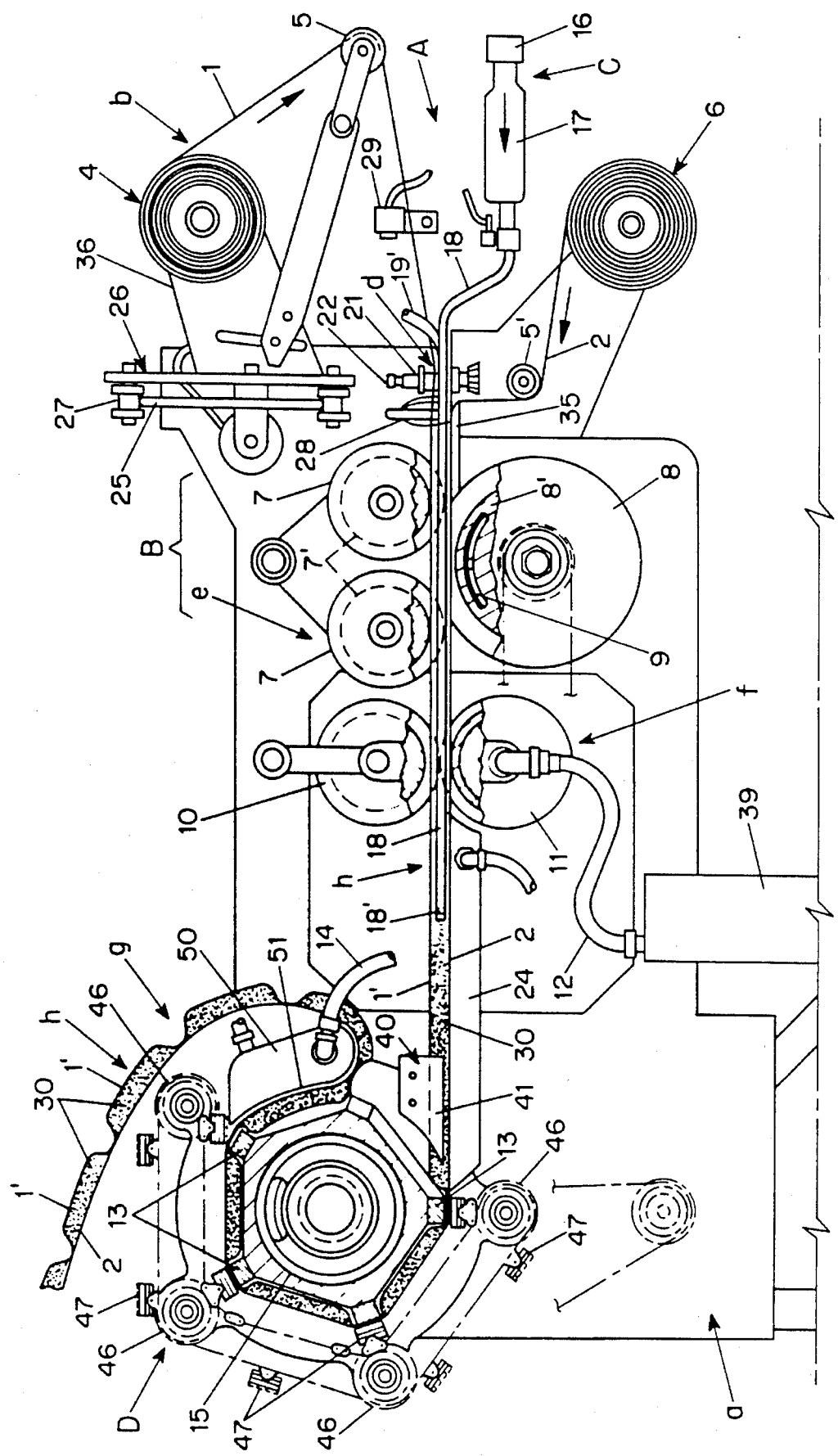
FIG. 1 is a schematic longitudinal section of the machine, which shows the process sequence as to its general structure and the arrangement of the different elements forming the same.
Figure 7:
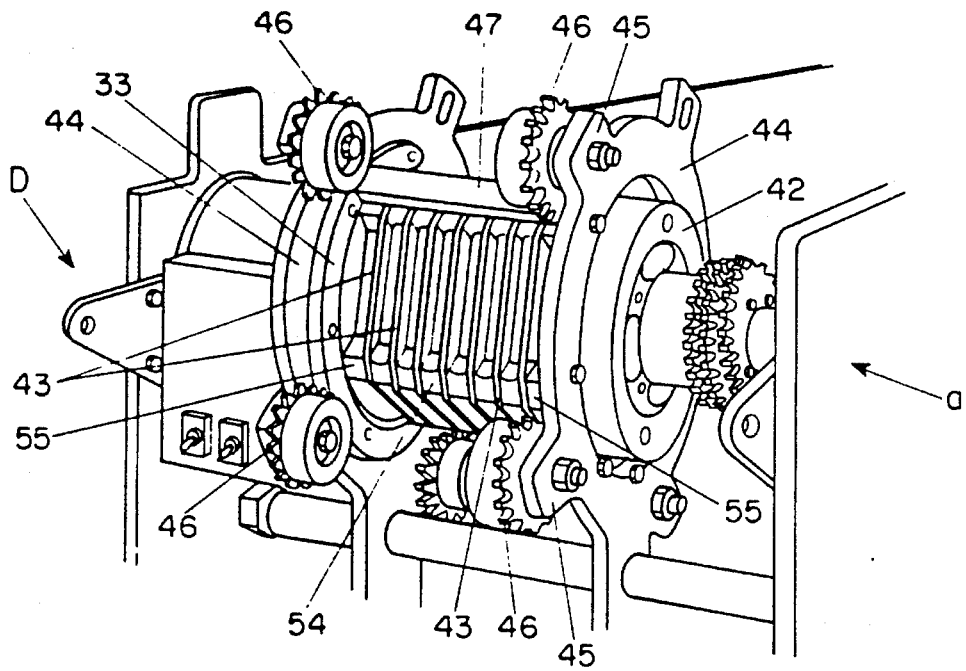

FIG. 7 is a detail view of the transversal welding unit, which comprises pinions wherein complementary jaws of the heating means arranged in the body of the endless conveyor are mounted, said jaws being completed by the correlative cooling means shown in FIG. 1, and said system including means for guiding-pressing the closure of clamps, which are shown in the form of semi-annular parts.

Figure 8:
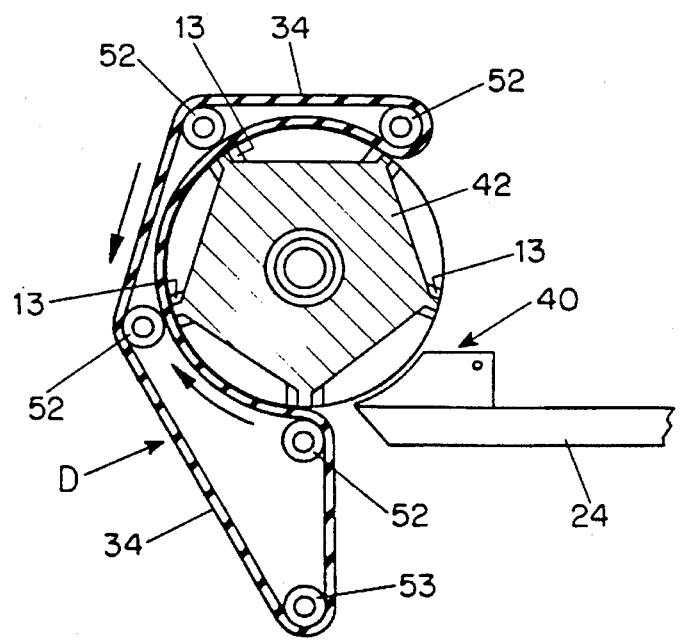

FIG. 8 is another schematic cross section detail of the welding unit according to one form of embodiment wherein the movable jaws of the heating means are replaced by an enless belt.

Figure 9:
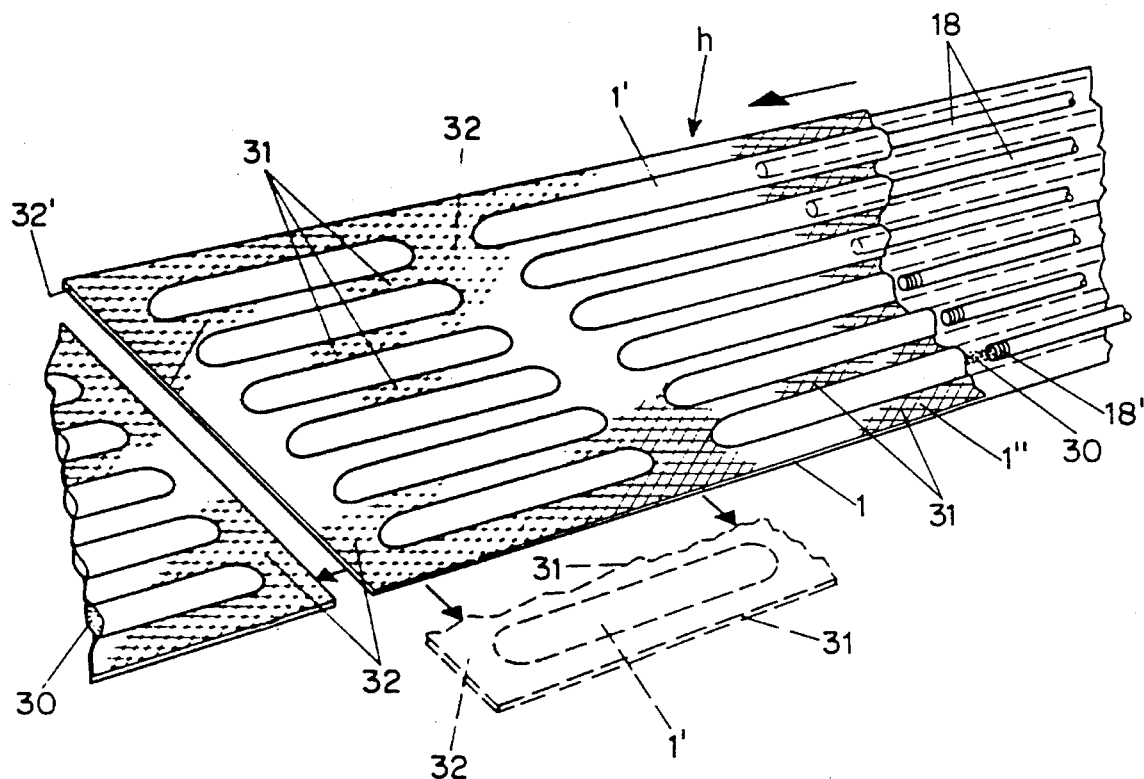

FIG. 9 is a perspective detail view of the product obtained by the process and machine according to this invention, which form fixed casings where the applicable product has been received and molded "in situ", wherein the zone adjacent each casing is wholly sealed by the welding of longitudinal stripes crossing the transversal stripes welding.

Likewise, this figures show a portion of the film set in a partial section view, so as to illustrate the presence of the product feeding pipes, thus forming a continuous stripe in the longitudinal cavities before the transversal welding; and, in addition, this figure shows the manner in which the sets of casings and their load, or each casing, can be separated through the cutting or weakening line; and, finally, In the different drawings, same reference numbers indicate equal or corresponding parts; letters were used for indicating the set of several elements.

Said references correspond to the following particulars, wherein:

(A)—continuous film advancing feeder (B)—longitudinal welding unit (longitudinal rotating welding)

(C)—transversal welding unit (a)—machine frame (b)—upper feeding device relative to the first thermoplastic film (1).

(b')—lower feeding device relative to the second thermoplastic film (2)

(c)—continuous advance feeder of product (30) to be packaged (d)—longitudinal folding pre-shaping means for (1)

(e)—set of welding rolls of the longitudinal welding unit (B)

(f)—set of cooling rolls of longitudinal welding unit (B)

(g)—means for cooling transversal welding unit (D)

(g')—endless jaws (47) conveyor in transversal welding unit (D)

(h)—set of films (1)—first thermoplastic film (1')—transversal folding formed in (1)

(1")—stripes in (1) longitudinally overlapping film (2)

(2)—second thermoplastic film (2')—stripes in (2) longitudinally overlapping film (1)

(3)—longitudinal tubular cavity resulting from folding in (1)

(4)—coil of continuous feeding device (b) of first film (1)

(5)—tensor guiding roll of (1)

(5')—tensor guiding roll of (2)

(6)—lower coil of continuous feeding device (b') of second film (2)

(7)—grooved upper rolls of (e)

(7')—peripheral grooves of (7)

(8)—heating roll of longitudinal welding unit (8')—peripheral grooves of (8)

(9)—heating means of (8)

(10)—grooved upper rolls of (f)

(10')—peripheral grooves of (10)

(11)—cooling rolls of (f)

(12)—channeling hose for cooling fluid in (f)

(13)—fixed heating jaws in rotor (15)

(13')—moving jaws complementary to (13) which are mounted on the endless conveyor (14)—cooling hoses of (12) in (g)

(15)—endless conveyor rotor corresponding to jaws (13')

(16)—connector of (c)

(17)—distributor of the product to be packaged in (c)

(18)—rigid feeding pipes
(18')—outlets of (18) within (3)
(19)—rods carrying (19')
(19')—longitudinal folding members
(20)—attaching and regulating means for the lengthening of (19') in (21)
(21)—support for rods (19)
(22)—regulating crews in (d)
(23)—command heads for regulating (22)
(24)—moving table of films (h)
(25)—guide of carriage (26)
(26)—alignment balancing carriage in films (1) and (2), as supplied by feeder (b)
(27)—railed moving wheels for (26) in guide (25)
(28)—alignment guides in feeder (b)
(29)—photoelectric sensors
(30)—product to be packaged
(31)—welding longitudinal stripes
(32)—welding transversal stripes
(32')—weakening or cutting lines for fractioning (h)
(33)—means for pressing jaws (13) and (13') in welding unit (D)
(34)—endless belt (in replacement of moving jaws (13)
(35)—guide
(36)—arm
(37)—roll (7) welding edges
(38)—roll (8) welding edges
(39)—refrigerator
(40)—leading means
(41)—partitions
(42)—roll
(43)—separators
(44)—annular supports
(45)—radial projections
(46)—pinions
(47)—moving jaws
(48)—roller bearings
(50)—cooling unit
(51)—bending surface of (50)
(52)—rolls
(53)—regulating motor roll
(54)—plane welding surface
(55)—side surface

IV—DESCRIPTION

In general terms, the process for packaging products such as sausage paste (3), either skinless or other, using two overlapping thermoplastic films (1) and (2), so as to form fixed casings for the packaging and molding of the said product (30), is characterized by comprising the following stages:

1) Feeding the thermoplastic films (1) and (2) as well as product (30) to be packaged therebetween, by a jointly sliding and continuous advancing movement (1-2-30).

2) Longitudinally and uniformly folding upper film (1)—while the other film (2) remains unfolded—, thus forming in each fold longitudinal continuous tubular casings (3) defined by longitudinal stripes (1"), wherein rigid pipes (18) channeling the package product (30) are used as part of the longitudinal folding pre-shaping means (d).

3) Joining by continuous welding of joint (31) said longitudinal stripes (1") of the first film (1) with overlapping zones relative to the second film (2), by means of two correlative heating (e) and cooling (f) stages, respectively, while the continuous advance movement of (h) is maintained to form tubular casings with films (1) and (2), simultaneously introducing the package product (30), such as frankfurter type sausage paste, along the resulting tubular casings. This union of film overlapping stripes is made by joint welding, by means of heating means (e) and cooling means (f)—e.g. rotating ones—, which are correlatively arranged in said order and which determine the same advance speed for both films.

4) Dividing the set of films (h) with the load of product (30), by jointly pressing on both virtual transversal stripes which, at predetermined distances, cross said tubular cavities (3) with their load (30), thus forcing the said load (30) contained in said zones to move, with the resulting pressure for shaping the tubular cavity in the predetermined manner.

(5) Welding said films in the same manner as for the film joint (1) and (2) of longitudinal stripes (13), once said films have come into contact in each transversal stripe (22), This film welding of stripes (32) is made by joint welding, using a transversal welding unit (D) and eventually a cooling means (g), which work in continuous advancing movement as correlatively arranged in said order.

The means pressing upon said transversal stripes and producing the subsequent welding, also produce the desired shaping at the ends of the fixed casing.

The means carrying the heating clamps supply the set of films (h) with a speed slightly higher than that defined by rolls of the longitudinal welding unit (B), so as to attain the suitable tension in said film set (h).

The machine for shaping packages and for packaging the product at stake (FIGS. 1 to 8), substantially comprises a frame (a), a continuously advancing feeder (A) of film material comprising a pair of thermoplstic films (1) and (2), and a continously advancing feeder (c) of product (30) to be packaged, which is channeled between said films (1) and (2).

At the inlet of the machine, there is a longitudinal folding pre-shaping means(d)(1') in one of said films, preferably the upper film, this being the first film (1).

Figure 2:
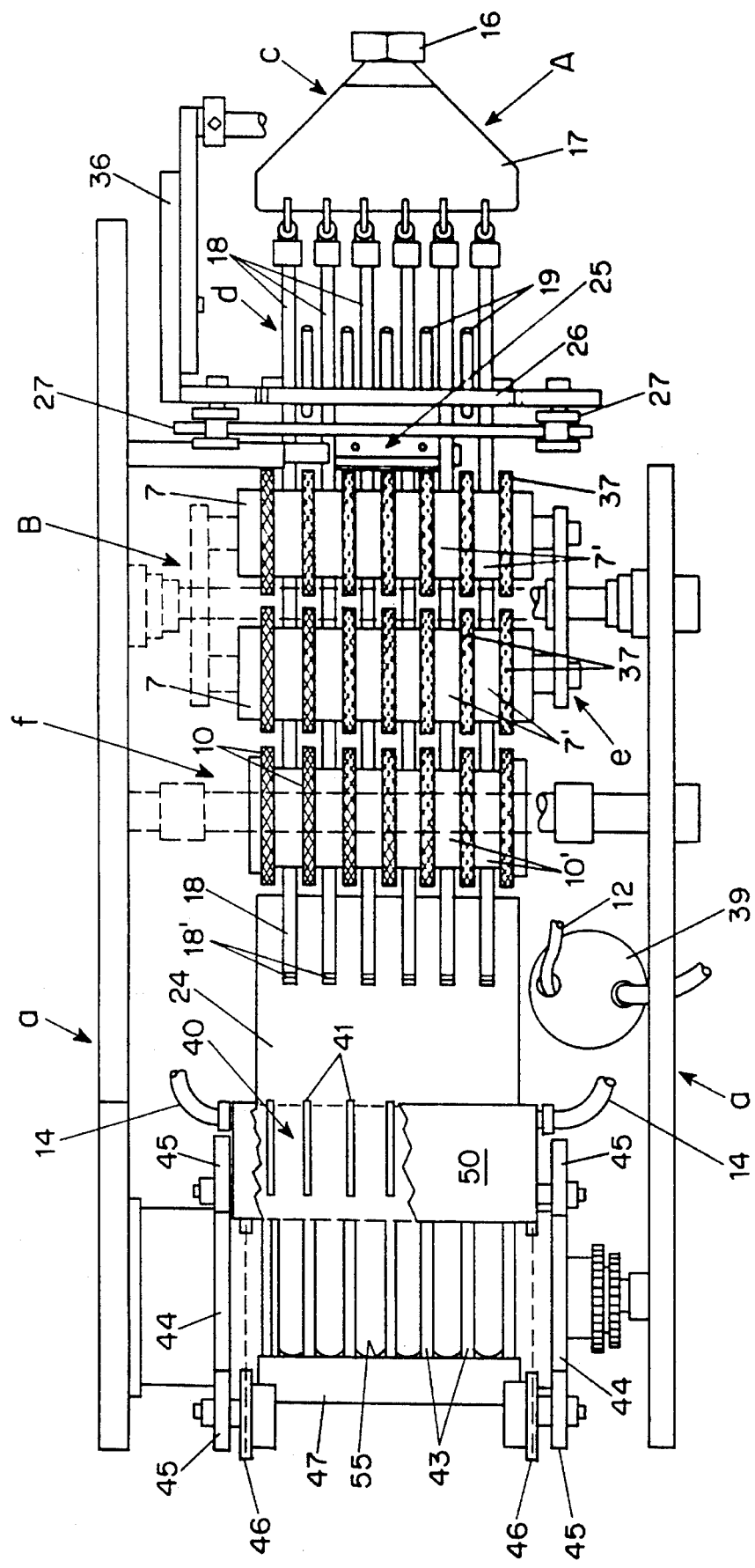
FIG. 2 is a plane view of the machine, which shows the arrangement of film feeding trains and also of the product submitted thereto; upper rolls of the first welding unit, wherein the corresponding perimetral grooves are also shown, together with the sealing bands.

Subsequent to said folding pre-shaping means (d) and according to the advancing direction of the film set (h)—formed by films (1) and (2)—the following elements are arranged: a transversal welding unit (D) of the already shaped films in packages containing product (30) (FIGS. 1 and 2).

More particularly, and as shown in the attached figures, the continuously advancing film feeder (A) comprises a coil (4) which, through a guide-tensor roll (5), feeds with the first thermoplastic film (1), which is directed to the inlet of the machine on a support plane guide (35) so as to overlap a second film (2) arranged in an lower position and fed by a lower coil (6) with the corresponding guiding and tensor rolls (5') (FIGS. 1 and 3).

By means of a force pump, an endless worm and other conventional mechanisms (not shown), the package product (30) reaches distributing case (17) through feeder (c), from which distributing case said product is channeled by a plurality of rigid pipes (18) (which number corresponds to the predetermined number of packaging lines), which extend at the inlet of the machine, passing through the folding pre-shaping means(d) of which they are component parts, and end in outlets (18'), which are arranged beyond the zone where cooling rolls (f) of welding unit (B) are present (FIGS. 1 and 3).

An automatic balancing device for the alignment of films (1) and (2) secures the exact overlapping of said films when concurring at the entrance of the machine, so as to avoid an angular transversal movement between said films (1) and (2), which would prevent the formation of the packaging casings.

To that effect, and as clearly shown in FIGS. 1 and 3, coil (4) of first film (1) is mounted on an arm (36) fixed to a transversal balancing carriage (26) which, by wheels (27), moves along a rail pattern in a direction transversal to the machine on guide (25), which is fixed to frame (a) of the machine. This carriage is electrically driven by a circuit controlled by photoelectrical sensors (29) and alignment guides formed by rolls (28) laterally arranged with respect to said rigid pipes (18).

The pre-shaping device (d)—FIG. 4—consists in a support (21) having mounted thereon a plurality of means for the attachment and lengthening (20) of rods (19) which, being threaded, are at their lower portion T-joined to longitudinal folding members (19'), which are rods at an equidistant direction with respect to the longitudinal direction of the machine and which, as shown in FIG. 1, comprise an initial bending zone in the form of suggested engagement, and which are arranged as partially inserted with respect to the rigid pipes (18)—FIG. 4—, so that the longitudinal folding (1') is produced on the first film (1) guided between members (19') and the said rigid pipes feeding (18), said longitudinal folding being completed when film set (h) reaches the zone where welding unit (B) is disposed. This folding pre-shaping means (d) is completed by regulating means (23) which allow to modify the folding size when modifying the height of support (21) and thereby also modifying the distance between members (19) with respect to rigid pipes (18) and also the transversal section of tubular casing (3).

On the other hand, welding unit (B) consists in a first set of welding rolls (f), correlatively followed by a second set of cooling rolls (f). Welding rolls (e) comprise a pair of upper rolls (7) in parallel arrangement with respect to each other and having peripheral grooves (7') defining plane welding edges (37), and a lower roll (8) having heating means such as electro-resistors or the like and which periphery comprises welding edges (38) separated by peripheral grooves (8') (FIGS. 1, 2, 3 and 5).

Rolls (7) are in parallel arrangement to each other in a same plane beyond the path of film (1) and on both sides of the vertical plane passing through the axis of lower roll (8), said rolls (7) being arranged below film (2).

The arrangement of welding edges (38) in peripheral grooves (8') allows the heating thereof only for welding stripe (2') for longitudinal overlapping of film 2.

In turn, and subsequent to heating rolls (e), cooling rolls (f) comprise upper and lower grooved rolls (10), the latter ones being refrigerated through a conduit (12") by a refrigerating fluid coming from refrigerating means (39).

Grooves (7') of rolls (7) are of the same size as grooves provided in the upper roll (10) and are arranged in alignment with each other. Likewise, grooves (8') of lower roll (8) have the same size as grooves provided in lower roll (10) and are also arranged in alignment with respect to each other.

Thus, grooves (7') and (8') and those provided in rolls (10) form a path through which feeding rigid pipes (18) extend from distributor (17) until exceeding at a predetermined distance the said set of rolls (10).

On the same plane as guide (35), a support table (24) is provided for the movement of the film set (4) between the set of rolls (10) and the transversal welding unit (D).

At the end of said support table (24) facing the transversal welding unit (D), a leading element (40) is disposed, which comprises a plurality of partitions (41) in parallel arrangement with respect to each other and being perpendicular to said support table (24). Each partition is in alignment with welding edges (37) and (38) of rolls (7) and (8) and, therefore, with its longitudinal welding stripe (32) of film set (h).

The transversal welding unit (10) disposed following the free end of the support table (24) comprises a roll (42) in tangent arrangement above said support table (24) and comprises on its surface a plurality of fixed jaws (13) which are projected beyond said surface and are arranged in equidistant generatrixes with respect to each other, which separation is defined by the length of the individual package to be formed.

At the same time, a plurality of separators (43) extends between each pair of jaws (13), the distance between said separators corresponding to the distance between partitions (41) of the leading element (40).

Jaws (13) comprise conventional heating wheels (not shown) such as electro-resistors.

Jaws (13) have a plane welding surface (54) which is parallel to the generatrix of roll (42) and each of said side surfaces (55) extending from the plane welding surface (54) up to the roll surface (42) has a configuration defined by the shape to be given to the ends of each individual package of the product (30). Similarly, said configuration of side surfaces (55), when reducing the transversal section of the tubular casing (3), produces the necessary pressure from product (30) in its final individual package.

The respective annular supports (44) are arranged at the ends of roll (42), said annular supports comprising radial projections (45) on which the respective pinions (45) are rotatively mounted, said pinions carrying the respective endless driving chains, of which only their path has been illustrated in FIG. 1 for the better comprehension of the transversal welding unit (D).

Moving jaws (47) are mounted on both chains, the distance between said moving jaws (47) being the same as that separating fixed jaws (13) of roll (42), and said moving jaws being synchronized so that, when driving chains of moving jaws (47) rotate, they overlap fixed jaws (13) and push film set (h) through said fixed jaws (13) and moving jaws (47).

Following the end of the path of moving laws (47) pressing fixed jaws (13), there is a cleaning unit (50), which coincides with and extends along the generatrix of roll (42), which comes into contact with film set (h) being released from the pressure exerted by fixed jaws (13) and moving jaws (47).

In another form of embodiment of this invention shown in FIG. 8, the pressure of film set (4) on fixed jaws (13) is produced by means of an endless belt (34) mounted on rolls (52) rotatively mounted on radial projections (45) of annular supports (44), the movement and tension of said endless belt (34) being controlled by a motor roll (53) mounted near roll (42) in a regulated manner.

The process of this invention is carried out by the above described machine as follows:

Film (2) is fed from lower coil (6) around tensor guide roll (5') up to guide (35), passing thereabove, until reaching upper grooved rolls (7) and heating roll (8).

Film (1) of coil (4) is fed passing over tensor guide roll (5), above rigid pipes (18) and under folding pre-shaping means (19'), among feeding guides (28), above guide (35), until reaching upper grooved rolls (7) and heating roll (8), said film 1 being thus correctly overlaping film (2).

As the path of film (1) occurs through longitudinal folding pre-shaping means (d), said film (1) is subject to a different traction system with respect to film (2), for which reason, the former can have deviations along the overlapping path relative to said film (2) and cause inconveniences with the formation of tubular casings on each rigid pipe (18). For that reason, before entering said folding pre-shaping means (d), a photoelectric sensor is disposed, which controls the edge of film (1) and, when the predetermined path is moved, said photoelectric sensor activates a motor (not shown) which moves the balancing carriage (26) conveying coil (4) on its arm (36), on guide (25) fixed to the machine frame by wheels (27), until the detected deviation is corrected.

Feeding guides (28) laterally arranged with respect to said rigid pipes (18) cooperate with the said suitable overlapping between film (1) and film (2).

When films (1) and (2) reach upper grooved rolls (7) and lower heating roll (8), as shown in FIG. 5, film (2) is arranged in a substantially plane manner on the plane welding edges (37) of said heating roll (8), thus producing the heating of longitudinally overlapping stripes (2"), while film (1) forms longitudinal tubular casings (3) on and partially around rigid pipes (18), which defines longitudinally overlapping stripes (1"), with said overlapping stripes (2"), which are pressed one to the other by plane edges (37) of upper grooved rolls (7) and plane edges (38) of heating roll (8), thereby producing the heating of also longitudinally overlapping stripes (1") and the subsequent thermo-sealing thereof as a result of the pressure and heat thus applied, longitudinal welding stripes (31) being thus defined.

Following the advancing movement of the film set (h) formed by films (1), which forms tubular casings (3) and plane film (2), said film set (h) then passes through upper and lower grooved rolls (10) of the cooling system (f), which, upon pressing longitudinal welding stripes (31), cool them, thus quickly completing the fixing of thermoplastic welding to said longitudinal stripes (31).

The respective tubular casing (3) being thus formed around each rigid pipe (18), the respecting casings for housing the product (30) to be packaged are thus defined, said product being supplied to said respective tubular casings (3) through outlets (18') of rigid pipes (18) for feeding the product (30) as the said film set (h) advances. Said outlets (18') are of course arranged within tubular casings (3) beyond rolls (10) of cooling means (f), and above the support table (24) for supporting film set (h), the load of product (30) being within tubular casings (3).

For a suitable guiding operation and so as to allow the transversal sealing of tubular casings (3), film set (h) passes through leading element (40) so that tubular casings (3) pass between partitions (41), which keep the lateral pressure of said tubular casings of product (30), while longitudinal welding stripes (31) pass below partitions (41).

At the outlet of partitions (41), film set (h) is taken by jaw (13) of the corresponding roll (42) and moving jaw (47) of transversal welding unit (D), which makes tubular casings (3) to become flattened in said zone and attains the total movement of product (30) until films (1) and (2) come into contact one with the other, circumstance which, on account of the heating effect of fixed jaws (13) and the pressure exerted by moving jaws (47), thus produces transversal welding stripes (32).

As a result of the advancing movement of film set (h) on transversal welding unit (D), and the sealing of the first transversal stripe (32) being thus produced, tubular casing (3) and the product therein contained are housed between separators (43) provided in roll (42) between each pair of fixed jaws (13), until fixed jaw (13) and moving jaw (47) produce pressure and the subsequent flattening of the respective zone of the tubular casing (3) and the product therein contained, until films (1) and (2) come into contact one with the other, which, on account of the heating effect of fixed jaw (13) and the pressure exerted by moving jaw (47), produces the thermo-sealing of said second zone of contact between films, thus forming the second transversal welding stripe (32), which closes the open end of tubular casing (3) and forms the individual package of product (30) in the manner shown in FIG. 9.

The ends of each package of product (30) adopt the shape defined by side surfaces (55) of fixed jaws (13).

Film set (h) at the outlet of the last moving jaw (47) passes through the bent surface (51) of the cooling unit (50) so that plane film (2) is the one which comes into contact with the same bent surface (51), whereby transversal welding stripes (32) are promptly cooled.

Once the individual packages of product (30) are obtained, as shown in FIG. 9, said packages then undergo normal cooking and refrigerating processes, as well as partial cuttings on/or weakening zones on longitudinal welding stripes (31), as well as on transversal welding stripes (32).

Movements made by rolls of the longitudinal welding unit (B) as well as those made by transversal welding unit (D), and the advance movement made by the balancing carriage (26), have not been illustrated for being obvious to an expert in the art and so as to better show the inventive concept of the machine carrying out the process of this invention.

There is no doubt that once this invention is put into practice, the same could be modified as to certain details of construction and shape thereof, which will not imply a deviation from the main principles clearly supported by the hereto attached claims.

I claim:

1. A process for the continuous molding and packaging of a product in paste, semiliquid or liquid form, which comprises the following steps:

continuously feeding a pair of films, one above and the other below the tubes feeding the product to be packaged;

continuously shaping, between said films, tubular longitudinal cavities around each of said feeding tubes;

fully completely, by the necessary pressure and in continuous form, said tubular cavities with the product to be packaged;

pressing on transversal stripes over said cavities until said films come into contact and become welded, without interrupting the forward movement of the tubular cavities filled with the product, thus forming a vacuum tight package of the product therein packaged.

2. Process for the molding and of foodstuff substances for use in the packaging of products such as skinless frankfurter type sausage and the like, comprising providing two thermoplastic, overlapping films for shaping fixed casings for packaging and molding the product; feeding the films and the product to be packaged between them by a jointly sliding and continuous advancing movement; transversally folding one of said films to form longitudinal cavities and stripes; joining the longitudinal stripes of the first film by continuous welding with overlapping zones of the second film, by two correlative heating and cooling stages, respectively, while the joint continuous advance movement remains; introducing the product to be packaged throughout the length of the resulting tubular cavities and contains the same in longitudinal guides;

dividing the film set and the load thereof by uniformly pressing on virtual transversal stripes which, at predetermined distances, cross said tubular cavities with their load, thus forcing the product contained therein to move; and, welding the films at the film joint of the longitudinal stripes, once films have come into contact in each transversal stripe.

3. Process for the molding and packaging of foodstuff substances, according to claim 2, characterized in that it comprises continuously feeding the pair of films, one above and the other below the tubes feeding the product to be packaged; shaping one of said films around said tubes; longitudinally sealing said films at the point of lateral overlapping between said feeding tubes so as to form tubular cavities on said feeding tubes and close each end of said tubular cavities by transversal welding; filling the product to be packaged so as to have it wholly expanded within the tubular cavity; and transversally pressing at predetermined longitudinal distances the material existing on said transversal portion of the tubular unit until said films come into contact and are welded so as to form the transversal closure of the tubular cavities.

4. Process for the molding and packaging of foodstuff substances, according to claim 2, characterized in that the union of stripes of longitudinally overlapping films is made by a joint welding, by using rotating heating and cooling means which are correlatively arranged in that order, which determine the same advance speed for both films.

5. Process for the molding and packaging of foodstuff substances, according to claim 2, characterized in that the union of stripes of transversally overlapping films is made by a joint welding by using heating and cooling means which work as correlatively arranged in that order.

6. Process for the molding and packaging of foodstuff substances, according to claim 2, characterized in that the transversal folding is made in only one of the thermoplastic films, while the other such film is attached to the said first stripe of longitudinally overlapping films.

7. Process according to claim 1, characterized in that the first transversal stripe is welded prior to the pressure-filling of said tubular cavities.

8. Machine for the molding and packaging of foodstuff comprising: a continuous advance feeder of two thermoplastic films having guides leading to a zone where both overlapping films concur; a transversal folding means for one of said films, thus defining continuous longitudinal cavities alternated by longitudinal stripes overlapping the other film; a longitudinal unit for welding the overlapping longitudinal stripes, at the end of which outlets of a package product feeder are arranged, which loads said product throughout the length of the cavities formed by the folding means; and a unit for welding the transversally overlapping stripes which, with pressing means, works at predetermined distances up to the contact limit of both films in said stripes of the set of films; wherein each welding unit comprises heating means followed by cooling means correlatively arranged in said order according to the advance direction of the set of films.

9. Machine according to claim 8, characterized in that it comprises: a continuously advancing feeder of the set of films, which concur toward an overlapping zone thereof; a pre-shaping means for the transversal folding of the first film, which comprises members which, as extended in the longitudinal direction of the sliding movement of said set of films, are arranged in a trefoil manner with respect to the set of rigid tubes disposed as taps forming longitudinal cavities, alternated with longitudinal overlapping stripes with respect to the second film, and including means for regulating its relative position with respect to the said tubes; a longitudinal rotating welding unit formed by a first set of heating rolls including peripheral grooves which coincide with the alignment of said longitudinal overlapping stripes, then followed by a second set of cooling rolls; a continuous package product feeder, canalized through said rigid tubes which, as partially interposed in the film set, end with their outlets for the said product immediately following the said welding unit and comprising means for pushing the product in the same direction as the advancing movement of the set of films; and a transversal welding unit for heating and cooling clamps correlatively disposed and formed by opposite jaws on the transversally overlapping stripes arranged at distances fixed along the waved set of films, further including means for pressing said set of films, up to the contact limit of the transversal stripes corresponding to each film.

10. Machine according to claim 8, characterized in that the pressing means are guides for the jaws of an endless carrier against another heating jaw followed by a cooling jaw, cooperatively, arranged on their passage on a head.

11. Machine according to claim 8, characterized in that said pressing means are formed by an endless belt.

12. Machine according to claim 8, characterized in that said heating means of the welding units are electro-resistors which, fed by an electrical circuit, are housed within one of the heating rolls.

13. Machine according to claim 8, characterized in that the heating means of the welding units are formed by a channeling circuit for a hot fluid, which passes across one of the heating rolls.

14. Machine according to claim 8, characterized in that the guides for the overlapping union of said films, include at least feeding sensors among films with respect to the inlet of the folding means, which controls balancing movements in a carrier for the coil of at least one of said films.

15. Machine according to claim 14, characterized in that the feeding sensors are photoelectrical.

16. Machine according to claim 8, characterized in that the transversal welding unit includes partially cutting means for cutting said stripes, which defines lines that are weakened for the transversal fractioning of the set of films, while the product is housed in fixed cavities.

17. Machine according to claim 8, characterized in that from the respective feeding coils, the films converge in overlapping arrangement on a guide, wherein the first of said films, which is the upper one, is guided towards the inlet of the folding pre-shaping means, while the second sheet is arranged in a lower position and moves on the guide together with the former film.

* * * * *